June 4, 1963 R. H. SHEPPARD 3,092,083
PISTON FOR POWER STEERING SYSTEM
Filed Jan. 18, 1960 2 Sheets-Sheet 1

INVENTOR
*Richard H Sheppard*
by *Henry H Snelling*
ATTORNEY

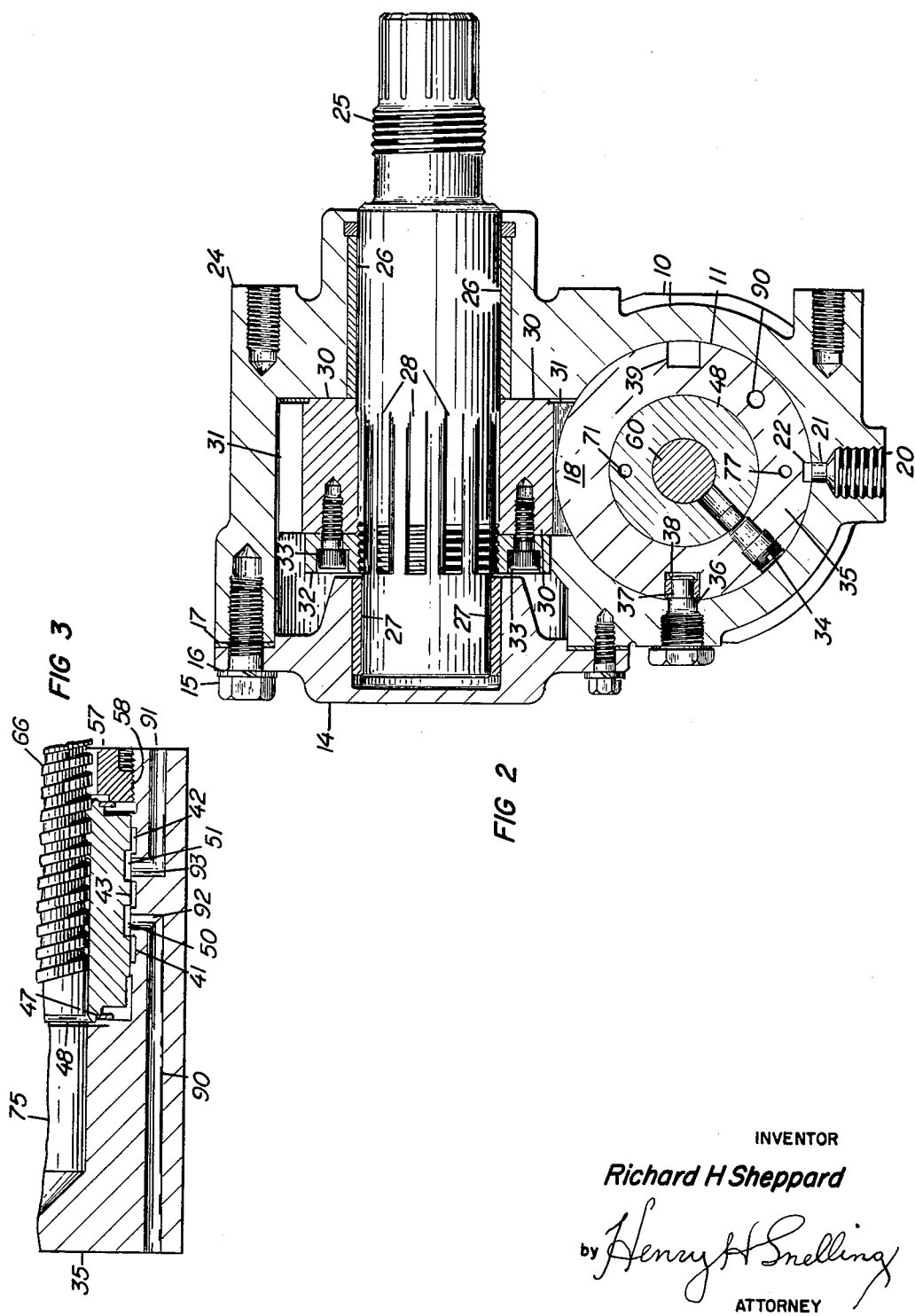

United States Patent Office 3,092,083
Patented June 4, 1963

3,092,083
PISTON FOR POWER STEERING SYSTEM
Richard H. Sheppard, 101 Philadelphia St., Hanover, Pa.
Filed Jan. 18, 1960, Ser. No. 3,081
7 Claims. (Cl. 121—41)

This invention relates generally to steering gears for automotive vehicles, and particularly to pistons for driving the output steering shaft of an automobile by a rack and pinion or equivalent connection. The term "automobile" as here used includes any wheeled vehicle for use either on or off the highway.

A main object of the invention is to increase the efficiency of the steering gear assembly by insuring that the piston travel is so limited as to avoid damage to any part of the mechanism by a power movement of the piston, while permitting the piston to be moved still farther by movement of the steering wheel in hands of the driver as there is no danger of damage under such circumstances even though the driver be quite brawny.

Another important object of the invention is to provide means in the distributing valve forming part of the piston, so that the pressure on both sides of the distributing valve is equalized. This object is achieved even though the distributing valve is held in midposition by a pair of annular flat spring washers.

A further object of the invention is to decrease the size of the slot or passage in the piston which first receives the oil under pressure for moving the piston.

In the drawings:

FIG. 2 is a section at right angles to FIG. 1.

FIG. 3 is a section taken in a plane at an angle preferably 135° from the horizontal plane of FIG. 1, this view showing the passageways for delivering fluid under pressure from the entry groove of the distributing valve to the two sides of the piston.

Figure 1:
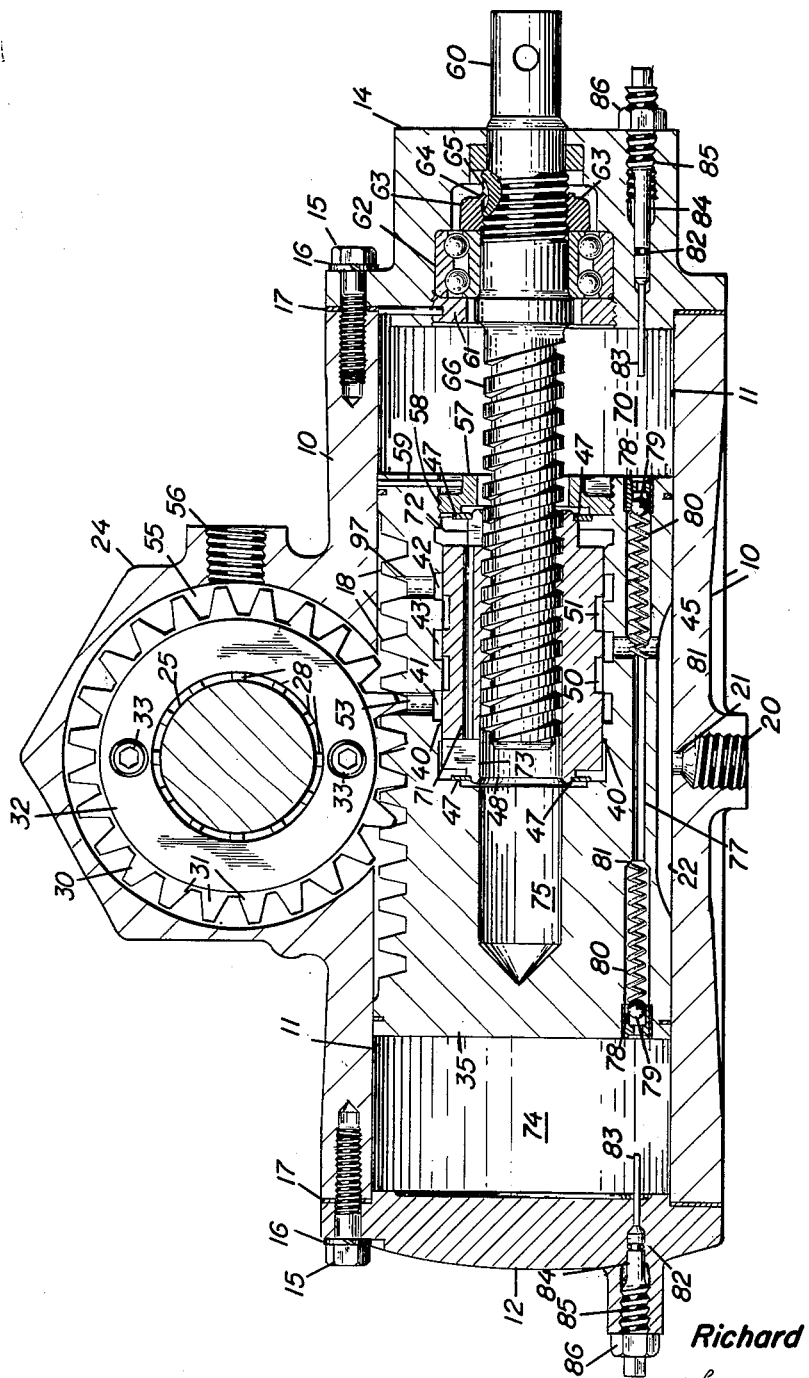
FIG. 1 is a horizontal axial section through the actuating shaft and its pinion.

In FIG. 1 the housing 10 has a central bore 11 and is closed at one end by a cylinder head 12 and closed at the opposite end by a bearing cap 14 both closures being secured to the housing in usual manner as by bolts 15, lock washers 16, gaskets 17. The housing 10 also has a threaded inlet port 20 leading to a much restricted coaxial opening 21 opening into a groove 22 of the same width as the diameter of opening 21, groove 22 being a pressure fluid distributing slot which is of the dimension stated in order to minimize pressure on the side of the piston opposite the groove or slot 22. In an integral extension 24 of the housing the output shaft 25 is mounted in bearings 26 and 27 (see FIG. 2) and carrying on splines 28 between the bearings a gear 30 having teeth 31 and being locked in place by the nut 32 threaded on the splines and by gear retaining cap screws 33.

Within the bore 11 piston 35 moves coaxially of the bore but is held against rotative movement about its axis by pin 36 threaded in housing 10 and carrying at its inner end a roller 37 fitting in slot 38. A similar slot 39 is cut in the piston at 180° for use when the piston is to be reversed. Valve positioning pin 34 prevents relative turning of the valve 48 and the piston 35. On the side of the piston 35 nearest the output shaft 25 are rack teeth 18 meshing with gear 30 on this output shaft which normally is vertical in road graders and tri-cycle farm tractors but is horizontal in most four wheeled vehicles such as highway trucks.

The piston has a distributing valve bore 40 broken by parallel grooves 41, 42 and 43, the latter being in communication with port 45 receiving fluid through slot 22 and inlet port 20. Distributing valve 48 is mounted in bore 40 and is held centered by a pair of flat annular reversing springs 47 which resiliently hold the valve 48 in midposition so that radial bore 45 in the piston admits pressure oil equally to grooves 50 and 51 in the valve. Where the steering gear can have maximum degree of irreversibility as when there is no reason for the driver to have the "feel" of his car, as for example in a road grader, the springs may be omitted; but by using springs 47 of suitable strength, the chosen degree of reversibility of the input shaft is obtained by the pressure of the annular springs 47 from the piston 35 to the valve 48 and hence to the screw portion of shaft 60 through a reversible thread 66, the lead angle of this thread determining the degree of reversibility of the entire mechanism before springs 47 are compressed and hydraulic operation begins.

Groove 41 at the left of valve 48 is in communication with radial port 53 through the teeth 31 and discharges into the chamber 55 (FIG. 1) which forms a reservoir and leads through exit port 56 to the pump (not shown) which delivers oil under pressure to entrance port 20.

A nut 57 is threaded as at 58 (FIG. 3) to the piston so as to adjust very accurately the position of the flat spring washers 47 and the valve 48. When this nut is correctly positioned it is locked in place by a pin 59 in any desired well-known manner. Precise adjustment of nut 61 positions the ball bearing 62 against threaded nut 63, which is anchored by having an inwardly projecting tab portion 64 engaging a slot 65 in actuating shaft 60, which by screw 66 advances or retracts the actuating valve to control flow of oil in the usual manner.

It is important that pressure in chamber 70 be equalized quickly with the pressure in closed chamber 75 on opposite side of the distributing valve 48 and hence a passageway 71 straight through this valve is provided. As the springs 47 would otherwise interfere it is necessary to provide radial slots 72 and 73 in the valve 48 to allow free flow. The provision of the chamber 75 and the shortening of the actuating shaft over models in which the shaft extends through cylinder head 12 gives a more efficient structure as in this way the area which would be lost by the shaft is saved and plunger action is avoided.

In order to prevent damage to king pins, links, etc. mechansims are provided to limit the power turning of the steering wheels, while permitting manual operation. This mechanism includes a pair of relief valves seated by oil pressure and by springs 80 but which become unseated when the piston 35 approaches either end of its travel so that at a chosen angle of about 10° from full turn the pressure is relieved. Preferably these valves are at the ends of a longitudinal passageway 77 which intersects radial port 45. A valve seat 78 at each end of passageway 77 receives a ball 79 held seated by a light spring 80 engaging the proximate ball and a shoulder 81, and by the much greater pressure of oil coming from inlet 20, groove 22, port 45 and passageway 77. One of the valves, preferably though not necessarily a ball, is unseated as the piston 35 approaches the end of its travel as the ball is engaged by the tip 83 of plunger 84 having a threaded engagement at 85 with the cylinder closure member. This accurate positioning of each of the plungers compensates for manufacturing discrepancies or variations in size of parts so there is no danger of damage to the vehicle as might occur if the full pressure of the steering gear were applied to a mechanical stop. The plunger is locked in adjusted position by nut 86 and an O-ring 82 prevents leakage. The size of the valves 79 and of the bore 45 is such as to insure that the volume of oil furnished can be carried at a relatively low pressure.

Referring now to FIG. 3, separate but coaxial passageways 90 and 91 lead from radial bores 92 and 93 communicating with grooves 50 and 51 in distributing valve 48 respectively and with the two chambers 74 and 70 on opposite sides of piston 35.

With the vehicle moving straight ahead, pressure fluid enters at 20, passes via groove 22 to bore 45 and passageway 77 seating both valves 79 and also passing via groove 43 in the piston (see FIG. 3) to grooves 50 and 51 in valve 48 so that oil passes equally through passageways 90 and 91 to the chambers 74 and 70 on the two sides of the piston and also from groove 43 in the piston via grooves 50 and 51 to radial bores 53 and 97 between the rack teeth 18 to the exit port 56 and the pump (not shown). The piston therefore does not move.

When the piston is moved to the right by turning actuating shaft 60 which moves valve 48 by screw 66 so as to increase pressure in chamber 74, oil passes thru entrance port 20, groove 22, radial port 45, groove 43, groove 50, bore 92, passageway 90, to chamber 74. Such movement of the piston forces oil from chamber 70 via passageway 91, port 93, groove 51, and to the pump through radial bore 97 and exit port 56. At the end of the allowed power stroke of the piston the right plunger tip 83 unseats proximate ball valve 79 so pressure from entrance port 20 passes to chamber 70, thereby checking further movement of piston 35 to the right because now pressure all passes back to the reservoir via grooves 50 and 51 in the valve 48, groove 42 and radial bore 97 in the piston 35. Consequently, there is no danger to the mechanism and the driver, while able to turn the steering wheel manually, does not have strength to do any damage.

What I claim is:

1. In combination, a housing having intersecting bores therein with their axes in planes at right angles to each other, a piston and an output shaft respectively in said bores, a pinion on the output shaft, a rack on the piston meshing with the pinion, said housing having an inlet port diametrically opposite the pinion and rack and leading to a restricted bore coaxial with the axis of the inlet port, said piston having therein an elongated distributing slot parallel to the axis of the piston and of a width equal to and communicating with said restricted bore, whereby to minimize pressure on the piston at the rack side, in which combination the piston has a passageway parallel to and communicating with said slot, a ball valve spring pressed to its seat at each end of the passageway, and a longitudinal adjustable, slender plunger at each end of the housing to engage the proximate ball and to force it off the seat against the pressure of its spring and the pressure of the fluid within the passageway as the piston moves within a chosen distance from either end of the piston bore in the housing.

2. In a power steering gear assembly, the combination with a cylinder, a piston slidable therein, a power shaft driven by the piston, a distributing valve within the piston, an actuating shaft having threaded engagement with the valve to move it axially, hydraulic means to reciprocate the piston upon rotation of the actuating shaft to move the valve axially, resilient means connecting the valve and piston so that when the actuating shaft is moved manually with the hydraulic means operative, such turning of the actuating shaft will turn the power shaft, of adjustable means to render the hydraulic means inoperative prior to the piston reaching the end of its travel, said last mentioned means releasing the hydraulic pressure on the piston and leaving the steering controlled by rotation of the actuating shaft unaided by the hydraulic power, whereby to avoid damage due to excess turning of the actuating shaft by power means.

3. In a power steering gear assembly, the combination with a cylinder, a piston slidable therein, a power shaft driven by the piston, a distributing valve within the piston, an actuating shaft having threaded engagement with the valve to move it axially, hydraulic means to reciprocate the piston upon rotation of the actuating shaft to move the valve axially, of means to render the hydraulic means inoperative prior to the piston reaching the end of its travel, said last mentioned means releasing the hydraulic pressure on the piston and leaving the steering controlled by rotation of the actuating shaft unaided by the hydraulic power whereby to avoid damage due to excess turning of the actuating shaft by power means, in which said means to render the hydraulic means inoperative includes: the piston having therethrough a passageway open to the pressure fluid, a valve at each end of the passageway held to its seat by the pressure fluid to close said passageway, and means at each end of the cylinder for moving the proximate valve from its seat so that the pressure fluid passes to the end of the cylinder to which the piston is moving.

4. In a power steering gear assembly the combination with a cylinder, of a piston slidable therein, a distributing valve within the piston and coaxial therewith, an actuating shaft for reciprocating the valve, hydraulic means to reciprocate the piston as the actuating shaft is turned, an output shaft operatively connected to the piston to revolve when the piston is reciprocated, thereby controlling the steering, and mechanism to render the hydraulic means inoperative prior to the piston reaching the end of its travel, said mechanism including a stop member at each end of the cylinder adjustably mounted for movement parallel to the axis of the piston, whereby power steering ceases upon operation of said mechanism by movement of the piston but leaves steering possible by manual turning of said output shaft.

5. The assembly of claim 4 in which said mechanism includes a passage through the piston closed at each end by two one-way valves held to their seats by the hydraulic fluid pressure.

6. The combination of claim 5 in which the mechanism includes springs additionally holding the valves to their seats and a slender adjustable member in the cylinder at each end to engage the proximate valve and to move it off its seat at a chosen distance of travel of the piston as determined by the adjustment of said member, said member entering the passage and being of such cross section area as to permit easy flow of the hydraulic fluid.

7. The combination with a piston which is closed at one end and has a coaxial cylindrical recess in the other end, of an actuating shaft extending into the piston, an annular valve having threaded engagement with the actuating shaft, and fitting within said recess, an annular washer at each end of the valve, resiliently holding the valve in chosen position, said valve having a longitudinal passageway straight therethrough, spaced from and parallel to the valve axis, said valve having a longitudinal slot proximate each resilient washer to permit passage of hydraulic fluid to said passageway to equalize pressure at the two sides of the valve, and to prevent plunger action as the actuating shaft is turned and the valve moves axially.

References Cited in the file of this patent

UNITED STATES PATENTS

| 561,747 | Worthington | June 9, 1896 |
| 1,790,620 | Davis | Jan. 27, 1931 |
| 1,937,485 | Davis | Nov. 28, 1933 |
| 2,014,195 | McCollum | Sept. 10, 1935 |
| 2,233,521 | Ernst et al. | Mar. 4, 1941 |
| 2,261,444 | Neubert | Nov. 4, 1941 |
| 2,746,426 | Gardiner | May 22, 1956 |